Feb. 26, 1935. A. D. CRAIG 1,992,293
FISHING LINE FLOAT AND SINKER
Filed Dec. 19, 1933 2 Sheets-Sheet 2
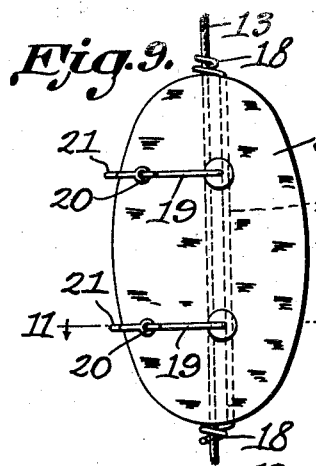
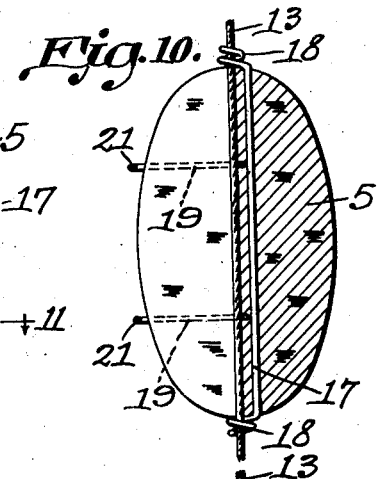
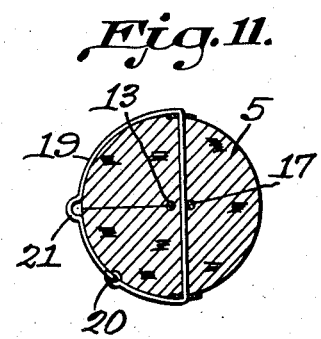
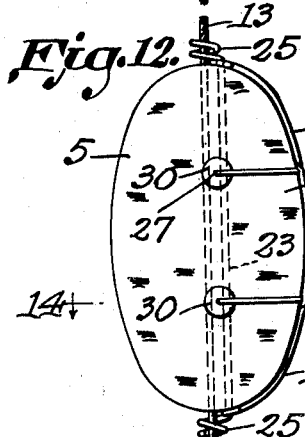
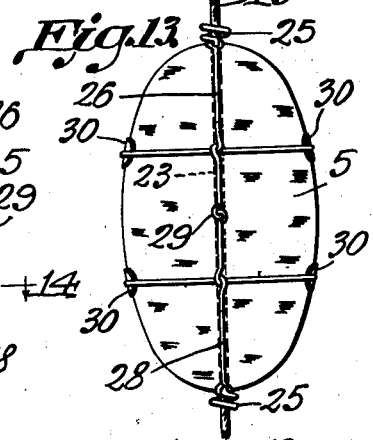
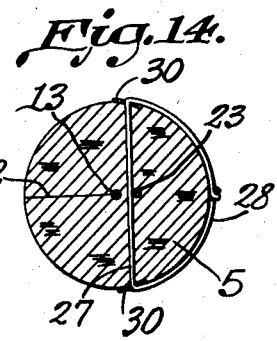
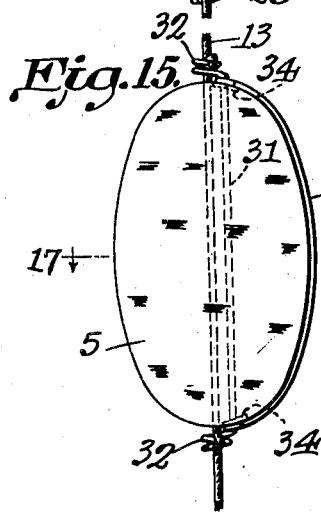
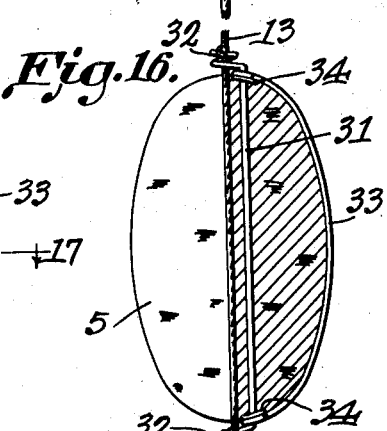
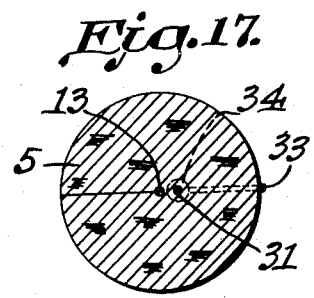
Arthur D. Craig Inventor
By C. A. Snow & Co.
Attorneys.

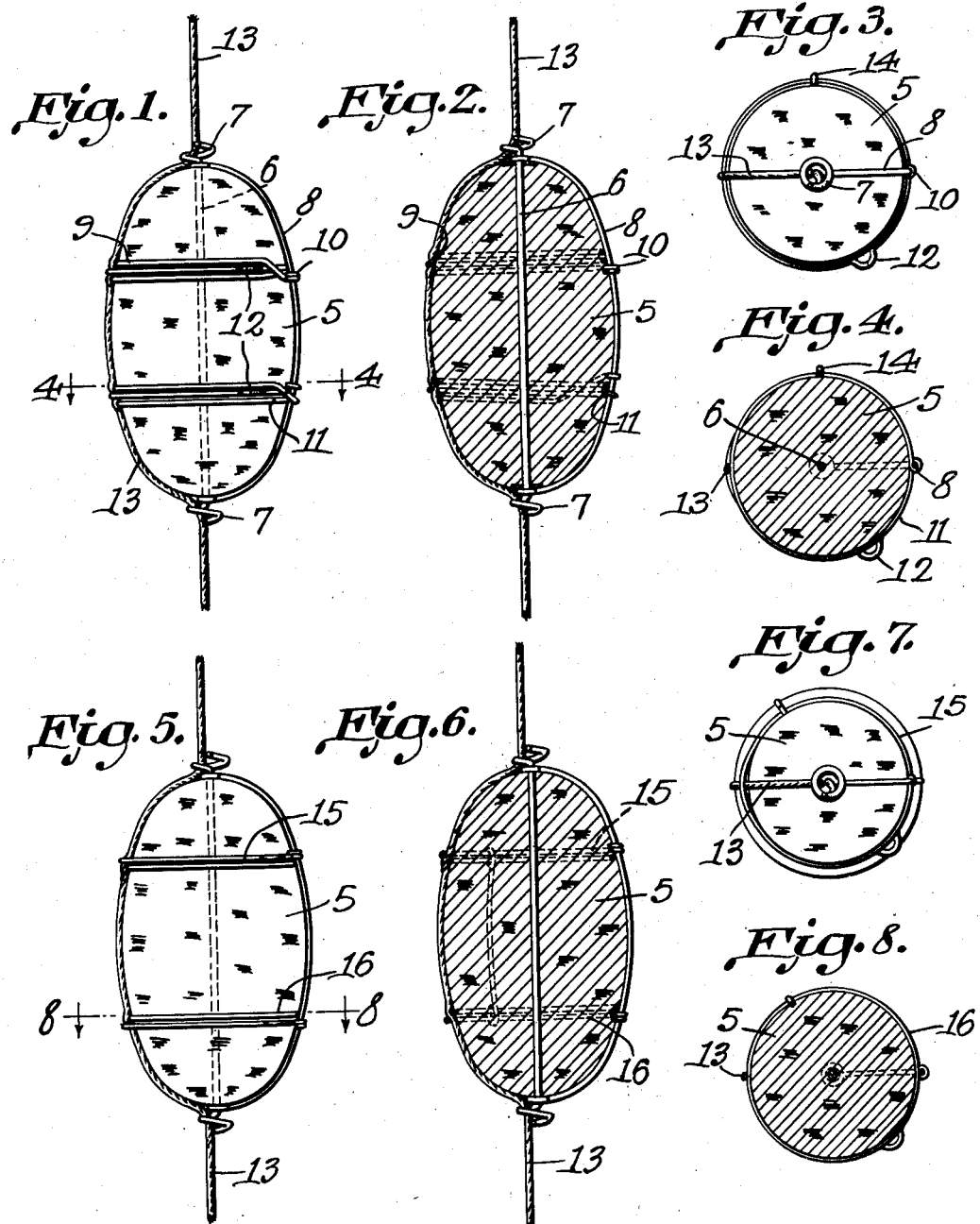

Patented Feb. 26, 1935

1,992,293

UNITED STATES PATENT OFFICE 1,992,293

FISHING LINE FLOAT AND SINKER

Arthur D. Craig, Springfield, Mo.

Application December 19, 1933, Serial No. 703,127

4 Claims. (Cl. 43—49)

This invention relates to fishing line floats, corks or sinkers, the primary object of the invention being to provide means whereby a float or sinker may be secured to a fishing line in such a manner that the float or sinker may be readily adjusted with respect to the hook of the fishing line, thereby regulating the fishing depth of the hook.

An important object of the invention is to provide a float or sinker of this character which may be readily adjusted or positioned, without the necessity of removing the hook from the end of the line and threading the line through a bore formed centrally of the float or sinker used with the line.

A further object of the invention is to provide a float having means whereby the float may be firmly secured in its positions of adjustment along the line.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is an elevational view of a float constructed in accordance with the invention.

Figure 2 is a longitudinal sectional view through the float.

Figure 3 is a plan view of the float.

Figure 4 is a sectional view taken on line 4—4 of Figure 1.

Figure 5 is an elevational view of a modified form of float.

Figure 6 is a longitudinal sectional view through the float.

Figure 7 is a plan view of this form of float.

Figure 8 is a sectional view taken on line 8—8 of Figure 5.

Figure 9 is an elevational view of a further modified form of float.

Figure 10 is a longitudinal sectional view through the form of float shown by Figure 9 of the drawings.

Figure 11 is a sectional view taken on line 11—11 of Figure 9.

Figure 12 is an elevational view of another form of float.

Figure 13 is an elevational view of the form of float shown by Figure 12 of the drawings, and taken at right angles to Figure 12.

Figure 14 is a sectional view taken on line 14—14 of Figure 12.

Figure 15 is a still further modified form of float.

Figure 16 is a longitudinal sectional view through the float.

Figure 17 is a sectional view taken on line 17—17 of Figure 15.

Referring to the drawings in detail, the reference character 5 designates the body portion of the float, which is constructed preferably of cork.

In this form of the invention a wire indicated by the reference character 6, is extended through the body portion, and disposed longitudinally thereof, the ends of the wire being coiled as at 7, the extremities thereof being spaced from the ends of the body portion 5, for purposes to be hereinafter more fully described.

The reference character 8 designates a wire that extends longitudinally of the body portion, the ends of the wire 8 being looped around the wire 6, at points adjacent to the ends of the wire 6, thereby securing the wire 6 against movement.

Secured to the wire 8 is a wire 9 that is wound around the body portion 5, making three loops, the opposite end of the wire 9 being secured to the wire 8, at 10.

Spaced from the wire 9, is a similar wire 11, which is also wound around the body portion 5, near the opposite end thereof, the windings of the wires 9 and 11 being such that they lie in parallel relation with each other, the middle winding of each wire 9 and 11, being provided with an offset portion 12, providing an eye, through which the fishing line 13, used with the float, may be threaded.

When the fishing line 13 has been threaded through the eyes 12, the fishing line is moved laterally, whereupon a binding action is set up between the fishing line 13 and wires 9 and 11, thereby securing the float on the line 13, against displacement.

A connecting wire indicated by the reference character 14 connects the wires 10 and 11, preventing the wires 10 and 11 from spreading.

The construction as shown by Figure 5 of the drawings, is similar to that shown by Figure 1 of the drawings with the exception that the wires 15 and 16 are positioned by making two wraps around the body portion, near the ends thereof.

It will be seen that due to the construction of the coils 7, formed at the ends of the wire 8, the fishing line 13 may be readily positioned within the coils, securing the line at the ends of the body portion 5.

In the form of the invention as shown by Figure 9 of the drawings, the body portion is formed with a central longitudinal bore and is split from the outer surface of the body portion, the split extending to the central longitudinal bore, the split portion permitting the fishing line 13, to be positioned within the bore of the body portion, without the necessary of threading the line longitudinally through the bore.

A wire indicated by the reference character 17 extends longitudinally through the body portion, in spaced relation with the bore of the body portion, bracing the float at the point of contact of the line, and preventing the line from cutting through the body portion.

The ends of the wire 17 are formed into coils 18 at the ends thereof holding the line in position at the ends of the body portion.

Disposed adjacent to each end of the body portion, is a wire 19 that extends transversely through the body portion, the ends of the wire being secured together exteriorly of the body portion, as at 20.

Offsets 21 are formed in the wires 19, the offsets being disposed directly over the split portion of the body to the end that the line may be threaded through the offsets and forced into the split portion and bore.

A further modified form of the invention is shown by Figure 12 of the drawings in which form the body portion 5 is provided with a slot or split portion 22 that extends longitudinally of the body portion, from the outer edge thereof to a point centrally of the body portion, thereby providing a structure which will permit of the positioning of the line, by pulling the line through the slot, eliminating the necessity of threading the line through eyes or offsets, as shown by the forms of the invention previously described.

A wire indicated by the reference character 23 extends longitudinally through the body portion in spaced relation with the inner edge of the slot 22, the ends of the wire 23 extending beyond the ends of the body portion 5, where they are formed into open loops 25, the openings of the loops being directly opposite to the slot 22, providing a lock for the line, at the ends of the body portion.

Connected with the wire 23, near one end thereof, is a wire 26, which extends over the body portion 5, from where it is extended laterally and passed transversely through the body portion as at 27, from where the wire is bent around the central portion of the wire.

At the opposite end of the body portion is a similar wire indicated by the reference character 28, which is connected with the opposite end of the wire 23, and passed over the body portion, longitudinally of the body portion, from where this wire 28 passes around the body portion and transversely through the center of the body portion, from where the wire extends over the body portion and is bent around the main portion of the wire, the ends of the wires 26 and 28, being interlocked as at 29.

Protecting washers 30 are positioned on the wires 26 and 28, and prevent the wires 26 and 28 from cutting into the body portion, while being positioned.

As disclosed by Figure 15 of the drawings, the body portion is split longitudinally from one edge thereof to a point substantially centrally of the body portion. A longitudinal wire 31 extends through the body portion near the inner edge of the split portion, thereby bracing the body portion against strains directed to the body portion by the action of the line.

The ends of the wire 31 are coiled at 32, the coils 32 being open and disposed so that the line will not pull through the split portion, after it has been positioned within the coils.

As clearly shown by the drawings, the line is looped around the coils 32, securing the line against displacement, after the body portion has been adjusted on the line.

A wire indicated by the reference character 33 extends longitudinally through the body portion 5, the ends of the wire being connected to the wire 31 near the ends thereof.

Washers 34 are positioned near the ends of the wire 31, and are engaged by the ends of the wire 33, preventing damage to the body portion when the wire 33 is being connected to the wire 31.

From the foregoing it will be seen that due to the construction shown and described, a float is provided, which may be readily and easily positioned on the fishing line and will be securely held in its adjusted position against accidental displacement while in use.

While I have shown and described the invention as forming a part of a fishing line float, it is to be understood that it is within the scope of the invention to secure fishing line sinkers to their lines by the same method, as set forth in the specification and drawings.

Having thus described the invention, what is claimed is:

1. A fishing line float comprising a body portion, a wire secured to the body portion and having loops at its ends through which a fishing line extends, securing the float to the fishing line, and a wire extending around the body portion and engaging the first mentioned wire securing the line against movement with respect to the float.

2. A fishing line float comprising a body portion, a wire extending through the body portion and having loops formed at its ends through which a line extends, securing the line to the body portion, and a wire extending around the body portion and connected to the first mentioned wire near the ends thereof, securing the first mentioned wire to the body portion.

3. A fishing line float comprising a body portion having a slot extending through the edge of the body portion to the center thereof, a wire extending through the body portion near the slot and having loops at its ends through which the fishing line extends, and a wire extended around the body portion, the ends of the last mentioned wire being looped around the first mentioned wire securing the wires to the body portion.

4. A fishing line float comprising a body portion, a wire extending through the body portion, loops at the ends of the wire and through which a fishing line extends, a wire extending around the body portion, loops at the ends of the last mentioned wire and looped around the first mentioned wire securing the wires together.

ARTHUR D. CRAIG.